(12) United States Patent
Salisbury et al.

(10) Patent No.: US 7,218,215 B2
(45) Date of Patent: May 15, 2007

(54) CARGO CONTAINER INTEGRITY SYSTEM

(76) Inventors: Robert A. Salisbury, 10700 Cross School Rd., Reston, VA (US) 20191; Christopher M. Smolen, 1754 West Rd., Oneida, NY (US) 13421; William S. Pantle, 7466 Rt 291, Stittville, NY (US) 13469; Scott F. Grimshaw, 1934 Amnaste La., Marcellus, NY (US) 13108

( * ) Notice: Subject to any disclaimer, the term of this patent is extended or adjusted under 35 U.S.C. 154(b) by 153 days.

(21) Appl. No.: 11/030,751

(22) Filed: Jan. 7, 2005

(65) Prior Publication Data

US 2006/0164231 A1    Jul. 27, 2006

(51) Int. Cl.
*G08B 26/00* (2006.01)

(52) U.S. Cl. .................... 340/505; 340/572.1; 235/385

(58) Field of Classification Search .. 340/572.1–572.8, 340/539.13, 505, 571, 545.4, 568.7, 10.1, 340/825.69, 539.22; 235/385
See application file for complete search history.

(56) References Cited

U.S. PATENT DOCUMENTS

| | | | |
|---|---|---|---|
| 7,019,640 B2* | 3/2006 | Canich et al. | 340/531 |
| 7,098,784 B2* | 8/2006 | Easley et al. | 340/539.13 |
| 2004/0041706 A1* | 3/2004 | Stratmoen et al. | 340/539.26 |
| 2004/0196182 A1* | 10/2004 | Unnold | 342/357.07 |
| 2005/0088299 A1* | 4/2005 | Bandy et al. | 340/539.16 |
| 2005/0252259 A1* | 11/2005 | Ekstrom | 70/257 |
| 2006/0164239 A1* | 7/2006 | Loda | 340/539.22 |

* cited by examiner

*Primary Examiner*—Phung T. Nguyen
(74) *Attorney, Agent, or Firm*—David Giglio

(57) ABSTRACT

There is provided a method and apparatus that monitors and records the status and cargo inventory of a shipping container. The shipping container includes a container control unit that records and monitors the status and inventory particular to that container. Sensors are provided within the container to determine the container status. A piezoceramic actuator provides power to rechargeable batteries in the container control unit. Thus the container includes a self contained power source. A bridge control unit monitors and records the status and inventory of every container on a vessel. A remote control unit monitors and records the status and inventory of every container worldwide.

14 Claims, 7 Drawing Sheets

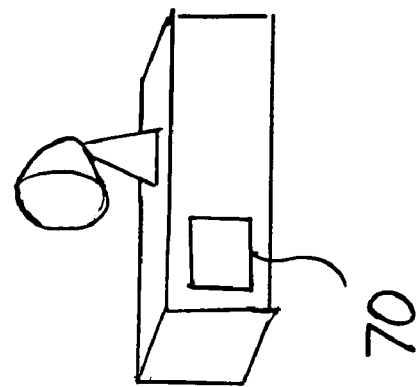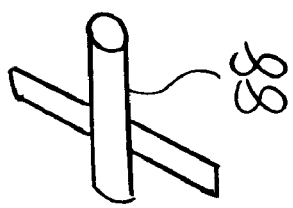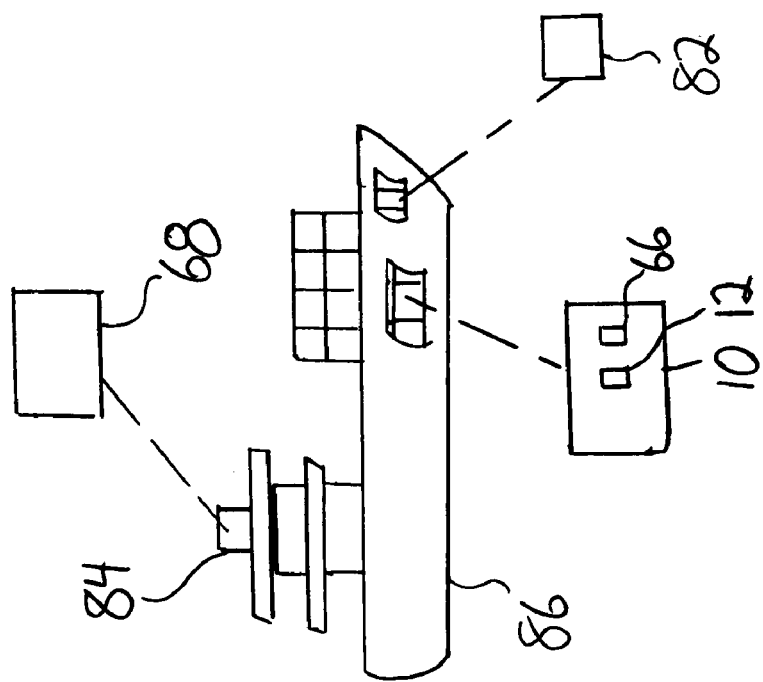
FIG. 7

CARGO CONTAINER INTEGRITY SYSTEM

FIELD OF THE INVENTION

The present invention relates generally to the shipping industry and, more particularly, to an apparatus and method of verifying the integrity and contents of a particular shipping container.

BACKGROUND OF THE PRESENT INVENTION

The events of 9/11 provided a startling wakeup call to the expanding horizon of tactics, methods and weapons that the myriad of terrorist groups could use to damage United States financial and commercial assets, critical infrastructure and its people. As a result of this heightened awareness, various border and shipping channel security efforts were launched.

Shipping containers are typically 8'×8'×20' in the shipping industry. These containers are loaded and then three dimensionally stacked for shipment from a far way point of origin. It has been identified that these container can carry many different types of hazardous cargo, including the terrorists themselves. Consequently, there are now conscience efforts to closely monitor the shipping industry and the cargo of the containers.

Many of these efforts comprise deploying more manpower to inspect more ports. In the shipping industry these inspectors can physically inspect more shipping containers than ever before. However, it is impossible to inspect all of the containers.

Further, by the time a container can be physically inspected it may already be too late. For example, a container containing significant radiological explosive material may be detonated prior to its inspection causing massive damage in and around a particular port.

Another problem with the current system is that there exist certain unfriendly nations and ports or easily compromised ports. Thus, these containers and there cargo are only as secure as the personnel at the ports where they are loaded.

SUMMARY AND OBJECTS OF THE PRESENT INVENTION

It is an object of the present invention to improve the art of security in the shipping industry.

It is another object of the present invention to prevent terrorists the opportunity to utilize vulnerabilities in the shipping industry from which they can deliver their blows.

It is yet another object of the present invention to provide a shipping container that is continuously monitored on a worldwide basis.

It is still another object of the present invention to provide a shipping container that includes electronic monitoring means for determining a variety of states within the container.

It is a further object of the present invention to provide a shipping container with electronic monitoring means that includes a self contained source of electrical power.

It is still a further object of the present invention to provide a central command that determines in real time the contents and status of a cargo container.

These and further objects are obtained in accordance with a shipping container that stores cargo. The cargo includes indicia relative to its contents. At least one sensor which senses a predetermined condition of the container is mounted within the container, preferably within a container control unit. The sensor automatically transmits a signal indicative of a sensed condition of the container to a microprocessor which is disposed within the container control unit.

The control unit also includes a radio frequency identification scanner that scans the cargo as it is loaded into the container. The microprocessor includes software which builds and maintains an inventory of the cargo and sensor information. This inventory is stored into a memory.

The software includes encoding capabilities for generating an informational or alarm signal. These signals can be transmitted periodically, in response to an event, or upon an external request for information. The control unit further includes a transmitter and receiver to accomplish external communications.

Rechargeable batteries in the container control unit provides power. To create a self-container power source for charging the rechargeable batteries, a piezoceramic actuator coupled to a conditioning circuit provides a constant useful voltage that keeps the batteries charged.

The sensors within the container can be almost any type of desired sensor to monitor certain conditions. Among these sensors there are chemical sensors, a biological sensors, an explosive sensor, a nuclear sensor, a radiological sensor, a global positioning sensor and a tamper sensor.

An external alarm unit mounted to the container exterior provides both audio and visual alarms. The external alarm unit may also include microprocessor and memory capability similar to the container control unit.

In a unique application, a radio frequency identification device transmits a unique code indicative of a particular container. This device is powered directly through the conditioning circuit, such that when there is no voltage through the conditioning circuit, the device does not transmit. In this sense, the device acts as a tamper identification sensor.

It is desirous to monitor each container from a central command. This central command includes a remote central control unit which includes software, memory, transmitting and receiving capabilities to accomplish this monitoring. Satellite communications are utilized as the communications link between the container control unit and the remote control unit.

Each vessel includes a bridge control unit that also includes software, memory, transmitting and receiving capabilities. This bridge control unit links the remote control unit to the container.

Thus, each container includes its own control unit to monitor and record its status and cargo history. Each vessel includes a bridge control unit that monitors and records the history of each container on the vessel. Finally, the central command includes a remote control unit that monitors and records the history of every container on every vessel worldwide.

BRIEF DESCRIPTION OF THE DRAWINGS

The present invention will be understood and appreciated more fully from the following detailed description taken in conjunction with the drawings in which:

FIG. 7 is a view of a worldwide system of tracking cargo and containers on a vessel showing certain exploded portions.

DETAILED DESCRIPTION OF THE PRESENT INVENTION

The present invention will now be described in accordance with a preferred embodiment and a method of using the same to monitor transportation of cargo containers and their contents.

Figure 1:
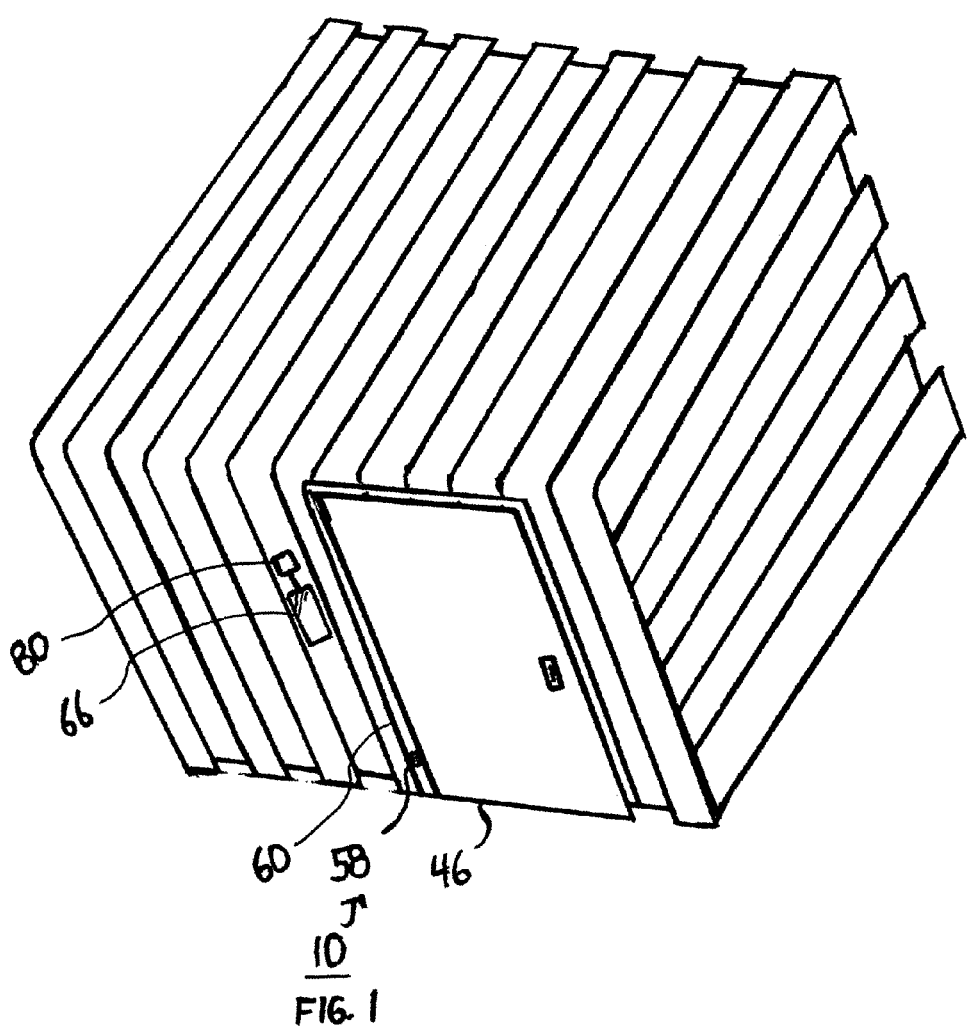
FIG. 1 is a front perspective view of a container in accordance with the present invention.

Referring to FIG. 1, a cargo container 10 is usually box shaped in which the interior and exterior surfaces can be smooth or corrugated. Typically, these containers are 8'×8'× 20'. On a vessel, these containers 100 are stacked in three dimensions, depicted in FIG. 2, such that a multiplicity of containers are transported during one trip from a point of origin to a point of destination, with a minimal waste of all important space.

For simplicity in describing and understanding the present invention, only one of the multiplicity of containers will be described as to its contents and status at a point of origin, in route and at a point of destination.

Assuming that the cargo container 10 is empty before being deposited on the vessel at the point of origin, at least one of, or more than one of the following are installed to the container.

Figure 3:
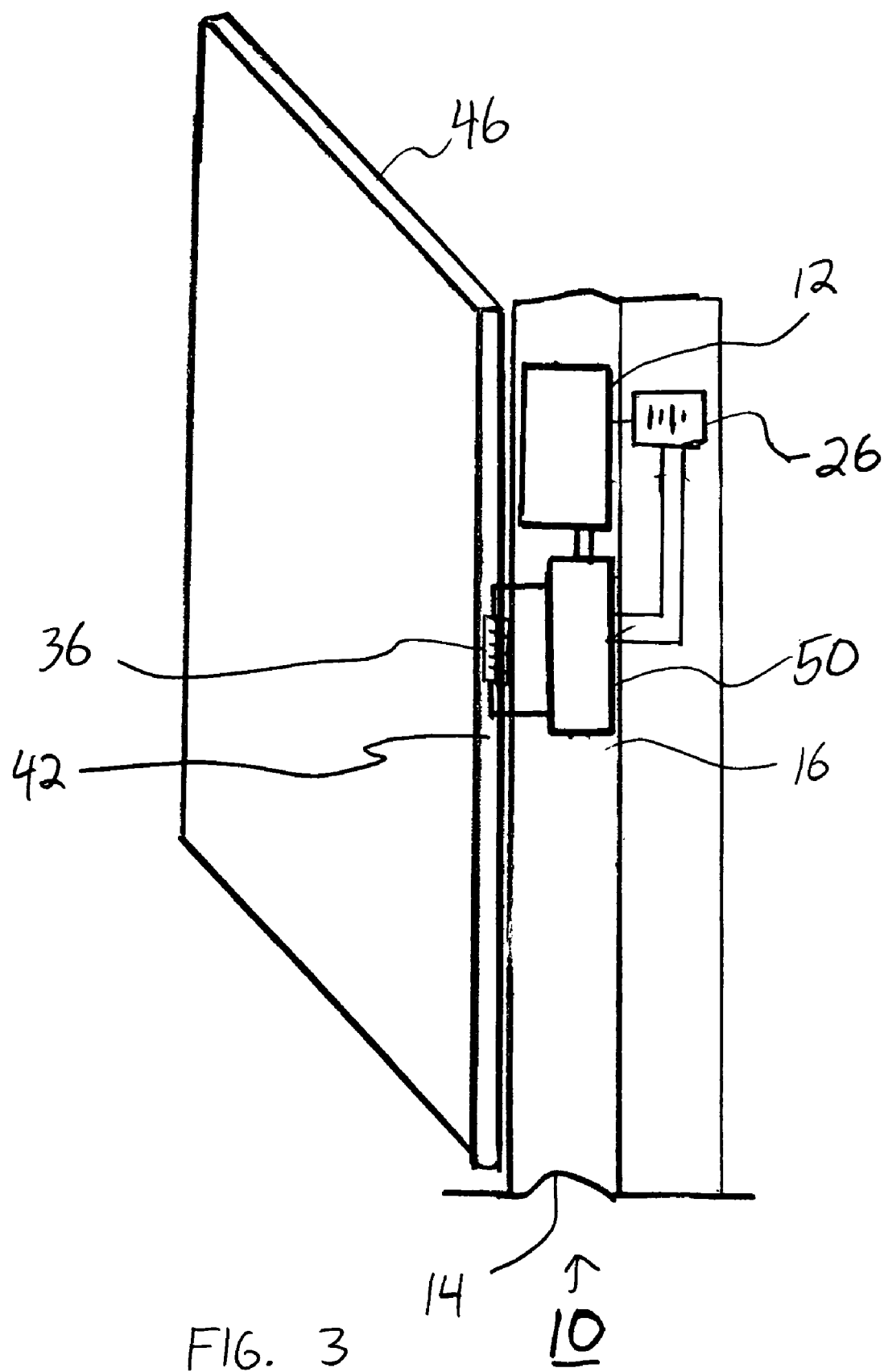
FIG. 3 is a front perspective view of a portion of the container of FIG. 1 from the inside viewing outward.
Figure 4:
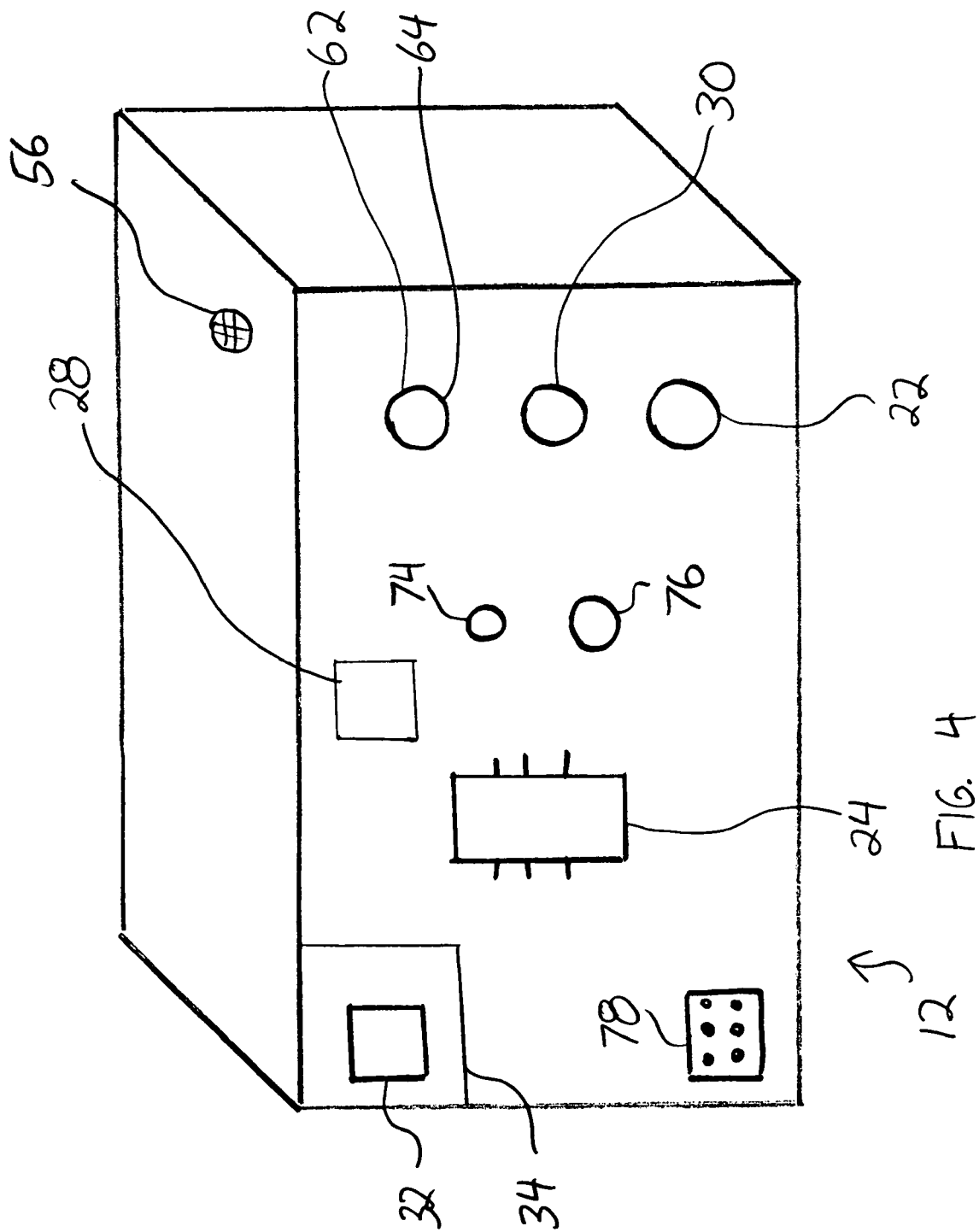
FIG. 4 is a front view of a container control unit of the present invention.

Referring now to FIGS. 3 and 4, a container control unit 12 is installed to the interior surface 16 of the container 10 in a position such that it does not interfere with the loading, storage or unloading of the container contents. In a preferred embodiment, the container control unit 12 is stored within one of a multiplicity of corrugated grooves 14 inherent to some containers.

Figure 5:
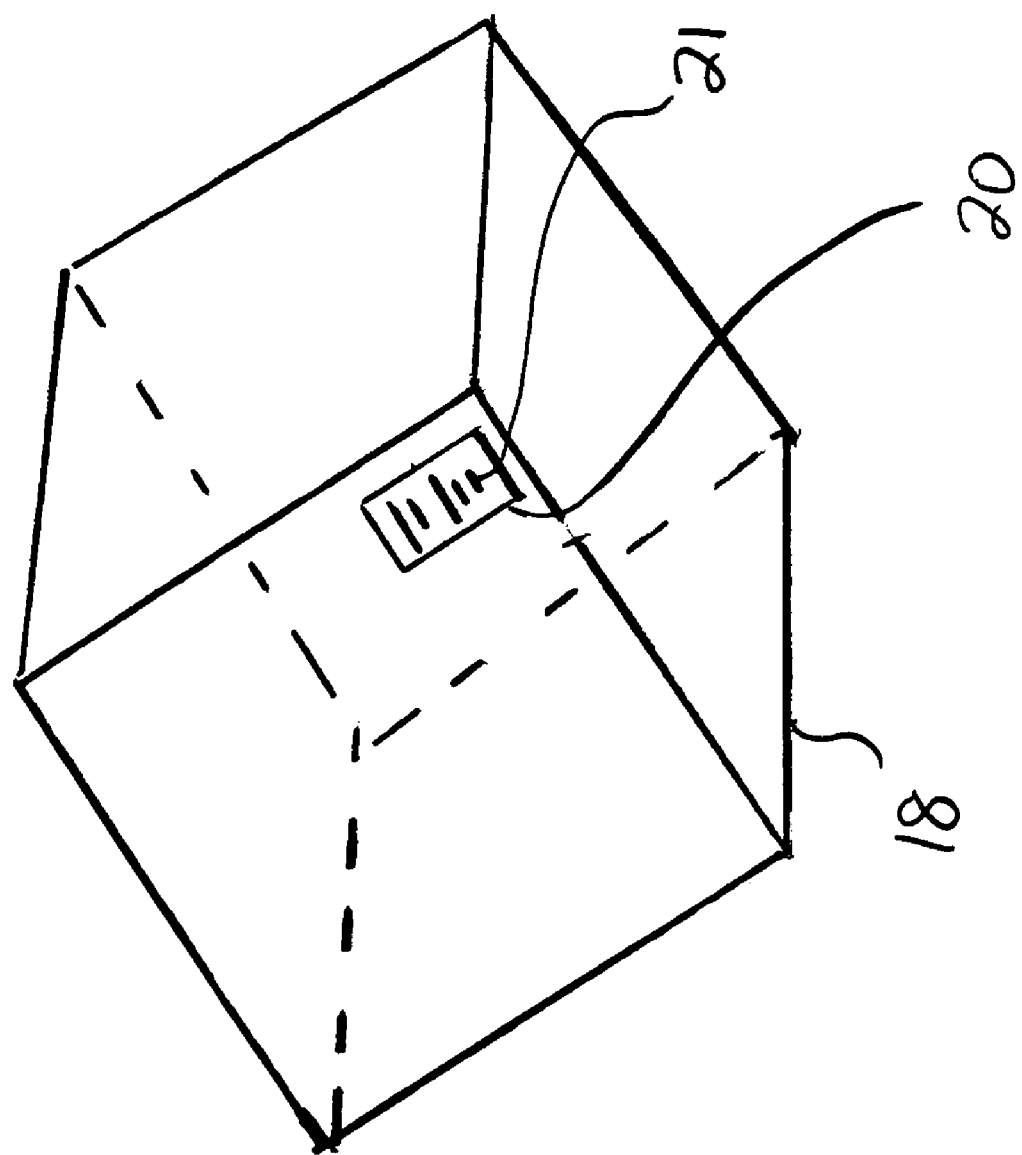
FIG. 5 is a front perspective view of a single unit of cargo in accordance with the present invention.

Increasingly, a single unit of cargo or part of the container contents, herein referred to as cargo 18, depicted in FIG. 5, includes a radio frequency identification ("RFID") tag 20 having indicia 21 describing the contents and history of the cargo. For example, the indicia might identify the quantity of a particular item, its weight, and where and when it was manufactured.

As each unit of cargo 18 is loaded into the container 10, a radio frequency identification scanner 22 integrated with the container control unit 12 reads the RFID tag indicia 21. This indicia is automatically transmitted to a microprocessor 24 within the container control unit 12.

The container 10 also includes an RFID tag 26, also referred to herein as an RFID transmitting device 26, which allows each container 10 to have a unique identity.

The microprocessor 24 includes software which builds and maintains an inventory of the transmitted indicia. This inventory is stored to memory 28 which is also disposed in the container control unit 12. This memory 28 stores the entire history of the contents, status and travel routes of the container 10.

One accesses the memory 28 and queries to determine at what point of origin the unit of cargo 18 was loaded into the container 10, and further to determine the route of travel of that the unit of cargo 18 until its removal from the container 10 at the point of destination.

Chemical, biological, radioactive, nuclear and explosive sensors are some types of sensors that are installed within the container 10. Other types of sensors include tamper and heat detection sensors. Further, global positioning systems can also be installed into the container 10 so that the container location can be identified upon demand, as will become apparent with further reading of the present invention.

There are many known types of sensors and global positioning systems. Any type of conditions that one desires to monitor within the container can be monitored with an appropriate type of sensor, which all will now be referred to as a sensor 30. The sensor 30 can be an active or passive device that requires power to operate. In a preferred embodiment, these sensors 30 are integrated within the container control unit.

Referring now to FIG. 4, rechargeable batteries 32 located in a battery compartment 34 provides power to the container control unit 12 and the microelectronic components integrated therewith.

Figure 6:
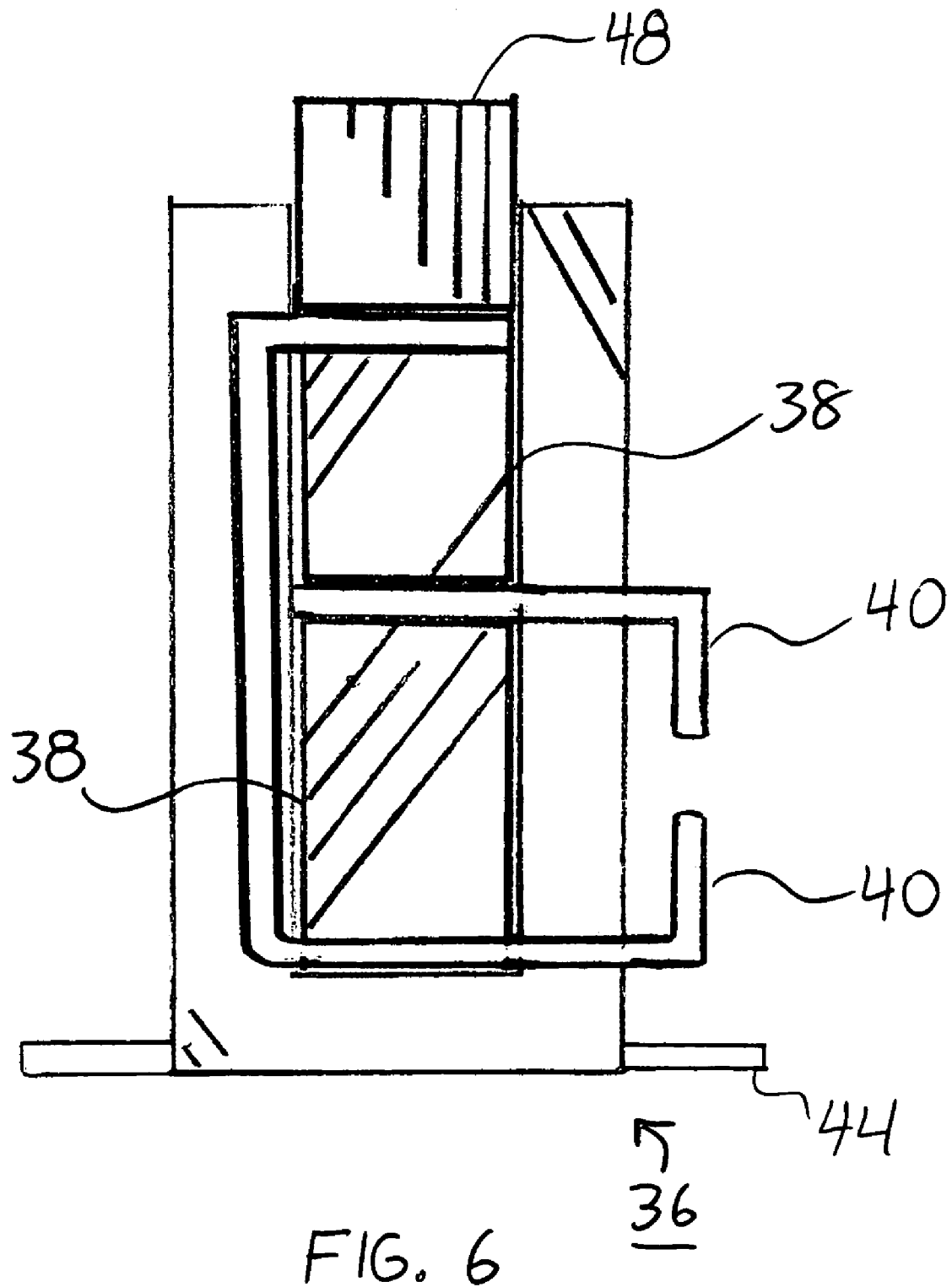
FIG. 6 is a cross sectional view of a piezoceramic actuator in accordance with the present invention.

Piezoceramic actuators are well known and have many applications. Referring now to FIG. 6, a piezoceramic actuator 36 typically includes stacked piezoceramic elements 38 having a pair of electrodes 40 extending therethrough. The physical dimensions of the piezoceramic elements 38 enlarge when a voltage is applied across the electrodes 40.

Conversely, the piezoceramic actuator 36 produces a voltage across the internal electrodes 40 when the piezoceramic elements 38 become compressed. Turning to the present invention, the piezoceramic actuator 36 is mounted to an interior portion of the container doorjamb or to the door hinge 42 via an integrated flange 44. When the container door 46 is open, the piezoceramic elements 38 assume their normal dimensions and no voltage is produced.

When the container door 46 is closed, it depresses a plunger 48 which in turn compresses the internal piezoceramic elements 38, thus producing a large voltage across the electrodes 40, sometimes as high as 5,000 to 10,000 volts.

The newly formed voltage appears through the internal electrodes 40 and then onto a custom conditioning circuit 50 depicted in FIG. 3. The conditioning circuit 50 reduces the voltage so that it trickle charges the rechargeable batteries 32 in the container control unit 12.

One advantage of the piezoceramic actuator 36 is that each container 10 includes a self contained power source and, therefore, the rechargeable batteries 32 do not require constant changing or recharging from external sources.

It should be apparent that the piezoceramic actuator 36 can be wedged between a pair of fixed support so that the plunger 48 is constantly depressed, thus providing continuous power to the conditioning circuit 50.

It should be noted that the vessel's electrical grid (not shown) can also be accessed to provide power to the container and the electronic components connected therewith. However, for portability, convenience and ease of unloading and loading the container onto the vessel, it is desirable to avoid utilizing the vessel's grid for supplying power as described herein.

The microprocessor 24 of the container control unit 12 depicted in FIG. 4 continuously monitors the output from container control unit internal sensors 30. The microprocessor 24 transmits the status of the sensors 30 upon demand, upon a change in status, or upon tampering which can be recognized by a loss of power.

The container control unit 12 and microprocessor 24 are low power consuming designs. The microprocessor 24 is typically a single chip processor with inputs and outputs.

The inputs include various signal both analog and digital from the sensors 30, the radio frequency identification scanner 22 and the radio frequency transmitting device 26. It shall also be understood that the RFID device 26 transmits externally independent of the container control unit 12.

The microprocessor 24 also includes two way transmission to the memory 28 and receives electronic signals from external sources such as from a bridge control unit 68, which will be described herein.

In a preferred embodiment, external communications is accomplished via a wireless link between an internal antenna 56 and a second antenna 58 which is imbedded in a conductive rubber seal 60 around the container door 46, depicted in FIG. 1.

The microprocessor 24 output signals include audio alarm, visual alarm, sensor status, global position identification, container identification, cargo data and history.

The microprocessor 24 continuously monitors the various input lines on a routine polling basis. An interrupt driven event represents the highest priority signal. In one preferred method, the interrupt triggered routine within the microprocessor 24 is non-triggered by an inverted power signal with battery backup. If this event is triggered all other processes are interrupted and an alarm signal is transmitted. Thus, there is provided a method of determining a loss of power to the container control unit 12 whether by impermissible intrusion or by power loss.

The container control unit 12 further includes a transmitter 62 and a receiver 64 which interfaces with the microprocessor 24. The transmitter 62 and receiver 64 allows the container control unit 12 to exchange data with external sources including an external control unit 66, the bridge control unit 68 and a remote control unit 70, depicted in FIG. 7, the interrelationship of which shall now be described.

The radio frequency identification scanner 22 integrated within the container control unit 12 reads the radio frequency identification indicia 21 from the cargo 18 as it is loaded and unloaded from the container 10. This indicia is automatically transmitted to the microprocessor 24.

Referring back to FIG. 4, a ready light 74 illuminates to indicate that all systems are operating. An alarm light 76 illuminates when an interrupt event occurs, while an audio alarm 78 provides an audio signal.

When the sensor 30 senses a predetermined condition, such as for example, a radioactive level exceeding a threshold level, circuitry integrated within the sensor 30 transmits a signal indicative of the sensed condition to the microprocessor 24.

The microprocessor software encodes a signal responsive to the received sensor signal, which is then transmitted to the external control unit 66.

The external control unit 66 mounts to the exterior of the container 10, preferably within one of a multiplicity of corrugated grooves and is also powered by its own set of rechargeable batteries. These rechargeable batteries also draw a trickle charge from the piezoceramic actuator 36 via the custom circuitry 50.

The external control unit 66 includes receiving capability that receives the responsive signal transmitted from the container control unit 12. The external control unit 66 includes transmitting capability that boosts and re-transmits the responsive signal encoded by the container control unit 12. Thus, the external control unit 66 functions essentially as a repeater.

Alternatively, the external control unit 66 includes software which decodes the encoded signal from the container control unit 12 and encodes an external responsive signal. Transmitter capabilities then transmits this external responsive signal to both an alarm 80 mounted exterior to the container 10 and also to a repeater 82 depicted in FIG. 7.

The repeater 82 receives, regenerates, boosts, and then retransmits the external responsive signal. A number of repeaters can be used to transmit the external responsive signal all the way to the bridge control unit 68 within the bridge 84 of the vessel 86. By now it should be understood that the information transmitted from the container control unit 12 can be alarm information or information indicative of the contents of the cargo 18 that was originally provided to the container control unit 12 by the radio frequency identification tags 20, the usefulness of which shall become apparent with a further reading of the present invention.

The bridge control unit 68 also includes a receiver which receives the encoded responsive signal, a decoder that decodes the responsive signal and alarm software and hardware that identifies within the bridge that particular condition in that particular container which has been sensed or breached. Thus, a bridge operator becomes aware of the breach.

The bridge control unit 68 also includes an encoder and a transmitter for transmitting a signal indicative of the sensed condition to a remote central command unit 70 via satellite communications 88. The remote central command unit 70 can be tied into various agencies including the military or coast guard. If terrorism is suspected, the vessel 86 can be intercepted or otherwise diverted to a safe haven.

The system just described shows an upward generated stream of information from the container 10 all the way to the remote central command, referred to as a remote control unit 70.

Often times it is desirable to query a particular container 10 to determine it real time status including location, contents and security state. This downward directed query can be performed from the remote control unit 70 or from the bridge control unit 68.

From the remote control unit 70, a request for information, request signal, is transmitted to the vessel bridge control unit 68 via satellite communications 88. The bridge control unit 68 decodes the request signal and generates an encoded signal that is transmitted via hold repeaters 82 to the external control unit 66 of the cargo container 10.

The external control unit 66 decodes the encoded signal from the bridge control unit 68 and generates another encoded signal which is transmitted to the container control unit 12 via either wired or wireless means.

It shall also be understood that in certain applications the remote control unit 70 bypasses the bridge control unit 68 and external control unit 66 and communicates directly with the container control unit 12. This application simplifies communications and is typically applicable when the container 10 is dry docked or not on the vessel.

The container control unit 12 decodes the request, queries its memory and then generates a responsive signal to the request for information. This responsive signal is then transmitted directly to the remote control unit 70.

It should also be apparent that the external control unit 66, or even the bridge control unit 68, could include the appropriate software and memory to store the same information as is stored in the container control unit 12. In fact, the bridge control unit 68 can store the information of each container on the vessel 86. Likewise, the remote control unit 70 can store the information of each container on every vessel.

Thus, for example, it is possible to monitor the entire shipping industry, including the history, contents and security status of every container, on a worldwide basis from one location via the remote control unit 70.

In one particular embodiment, each container 10 includes the radio frequency transmitting device 26 having a unique identifying digital code. The radio frequency transmitting device 26 draws its power from the piezoceramic actuator 36 via the conditioning circuit 50. This unique digital code transmits continuously.

When the container door 46 opens, the piezoceramic elements 38 assume their natural dimensions. Thus, no power is supplied to the radio frequency transmitting device 26, which in turns fails to transmit the digital code to the bridge control unit 68. Software in the container control unit 12, bridge control unit 68 and/or the remote control unit 70 decodes the lack of this radio frequency signal to determine that a particular container has been breached.

Figure 2:
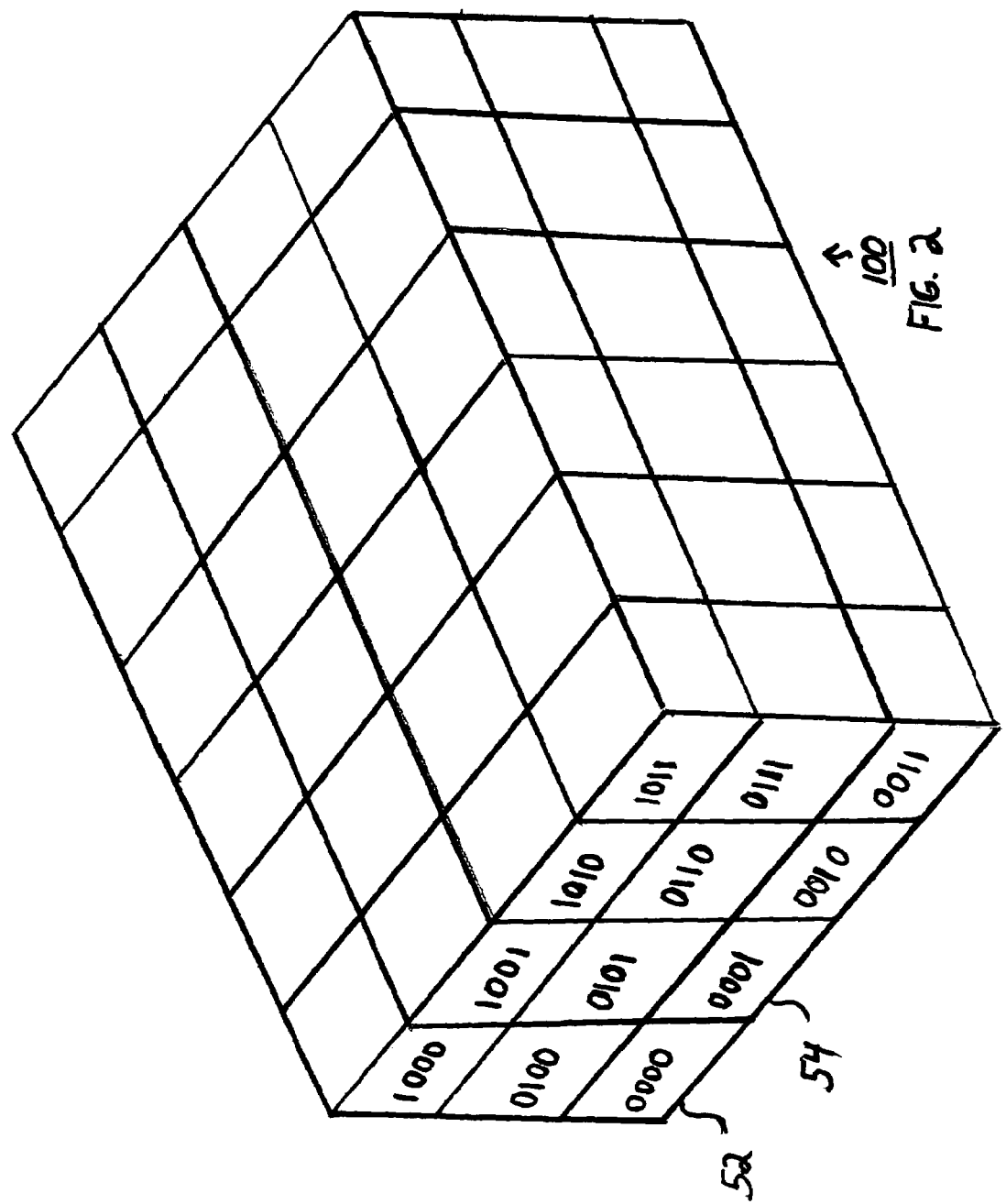
FIG. 2 is a perspective view of a stack of containers having identifying indicia in accordance with a preferred embodiment of the present invention.

For example and referring to FIG. 2, a first container 52 has an assigned digital code of 0000, while a second container 54 has an assigned digital code of 0001, and so on. A display located in the bridge displays only those breached codes or containers, simultaneous with a grid showing all of the containers on the vessel 86.

Thus, the piezoceramic actuator 36 in conjunction with the radio frequency transmitting device 26 operates as a tamper sensor and signal.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. A shipping container for storing cargo, wherein said cargo includes indicia relative to the content of said cargo said shipping container comprising:
   at least one sensor which senses a predetermined condition of said container, said sensor further including transmitting means for transmitting at least one signal indicative of a sensed condition of said container;
   a control unit disposed within said container, said control unit including,
   reading means for reading said cargo indicia,
   a microprocessor having software for building and maintaining an inventory of said cargo indicia and said at least one sensor signal,
   at least one rechargeable battery for powering at least said microprocessor;
   a piezoceramic actuator and a conditioning circuit for producing a suitable charge to said at least one rechargeable battery;
   memory for storing said inventory,
   said software further including an encoding means responsive to said at least one sensor signal, wherein said encoding means includes generating at least one alarm signal, and wherein said encoding means further includes generating at least one informational signal responsive to an external query;
   receiving means for receiving at least one external query, and
   transmitting means for transmitting said at least one alarm signal and at least one informational signal.

2. The container of claim 1, wherein said at least one sensor is selected from a group consisting essentially of a chemical sensor, a biological sensor, an explosive sensor, a nuclear sensor, a radiological sensor, a global positioning sensor and a tamper sensor.

3. The container of claim 1, further including an external mounted alarm unit which further includes at least one alarm selected from the group consisting essentially of an audible alarm and a visual alarm.

4. The container of claim 3, wherein said external mounted alarm unit further includes receiving means for receiving said at least one alarm signal and at least one informational signal and said at least one external query, and
   transmitting means for transmitting said at least one alarm signal and at least one informational signal and said at least one external query.

5. The container of claim 1, further including at least one radio frequency identification device having a unique indicia indicative of said container.

6. The container of claim 5, wherein said at least one radio frequency identification device obtains electrical power directly through said conditioning circuit.

7. An apparatus for remotely monitoring the status and cargo of at least one shipping container, wherein said cargo includes indicia relative to the content of said cargo, said apparatus comprising:
   at least one sensor which senses a predetermined condition of said container, said sensor further including transmitting means for transmitting at least one signal indicative of a sensed condition of said container;
   a control unit disposed within said container, said control unit including,
   reading means for reading said cargo indicia,
   a microprocessor having software for building and maintaining an inventory of said cargo indicia and said at least one sensor signal,
   at least one rechargeable battery for powering at least said microprocessor,
   a piezoceramic actuator and a conditioning circuit for producing a suitable charge to said at least one rechargeable battery,
   said software further including an encoding means responsive to said at least one sensor signal, wherein said encoding means includes generating at least one alarm signal, and wherein said encoding means further includes generating at least one informational signal responsive to an external query;
   receiving means for receiving at least one external query, and
   transmitting means for transmitting said at least one alarm signal and at least one informational signal and
   a remote central control unit having a transmitting means for transmitting said at least one external query and a receiving means for receiving said at least one alarm signal and at least one informational signal.

8. The apparatus of claim 7, wherein said remote control unit further includes software and memory for building and maintaining an inventory of the status and cargo of said at least one container.

9. The apparatus of claim 8, further including satellite communication means which interfaces said control unit to said remote central control unit.

10. The apparatus of claim 7, further including a bridge control unit between said control unit and said remote central control unit, wherein said bridge control unit includes transmitting and receiving means for transmitting and receiving said at least one external query, said at least one alarm signal and said at least one informational signal.

11. The apparatus of claim 10, further including an external alarm unit exteriorly mounted to said container, wherein said external alarm unit is between said control unit and said bridge control unit and includes transmitting and receiving means for transmitting and receiving said at least one external query, said at least one alarm signal and said at least one informational signal.

12. The apparatus of claim 7, wherein said at least one sensor is selected from a group consisting essentially of a chemical sensor, a biological sensor, an explosive sensor, a nuclear sensor, a radiological sensor, a global positioning sensor and a tamper sensor.

13. A tamper sensor for generating a tamper signal indicative of an impermissible intrusion to a shipping container, wherein said shipping container includes at least one access door, said tamper sensor comprising:
- a piezoceramic actuator which includes at least one internal piezoceramic element which produces an electric voltage when its physical dimensions are altered;
- a pair of internal electrodes of said piezoceramic actuator;
- a dimension altering means that alters at least one dimension of said at least one internal piezoceramic element, said dimension altering means being present when said at least one access door is closed and being absent when said at least one access door is open;
- a conditioning circuit that alters said voltage to a suitable voltage; and
- a radio frequency identification transmitting device that is powered through said conditioning circuit, said device having an encoded signal unique to said shipping container wherein said transmitter automatically transmits said encoded signal periodically such that the loss of said encoded signal is detected to determine that said container has been tampered.

14. The tamper sensor of claim 13 wherein said dimension altering means further includes compressing said actuator between said at least one access door and its associated door jamb.

* * * * *